United States Patent
Choi et al.

(10) Patent No.: US 7,270,417 B2
(45) Date of Patent: Sep. 18, 2007

(54) DISPLAY DEVICE AND DISPLAY METHOD IN WHICH RESOLUTION IMPROVING APPARATUS IS PROVIDED FOR PROJECT-TYPE DISPLAY DEVICE

(75) Inventors: In Ho Choi, Sungnam-si (KR); Sam Nyol Hong, Suwon-si (KR); Young Joong Kim, Seoul (KR); Kyung Taek Lee, Yongin-si (KR)

(73) Assignee: LG Electronics Inc., Seoul (KR)

( * ) Notice: Subject to any disclaimer, the term of this patent is extended or adjusted under 35 U.S.C. 154(b) by 267 days.

(21) Appl. No.: 11/024,670

(22) Filed: Dec. 30, 2004

(65) Prior Publication Data

US 2005/0275810 A1    Dec. 15, 2005

(30) Foreign Application Priority Data

Jun. 14, 2004  (KR) ..................... 10-2004-0043641

(51) Int. Cl.
*G03B 21/26* (2006.01)
*H04N 3/22* (2006.01)
*G02F 1/1335* (2006.01)
*G02B 26/08* (2006.01)

(52) U.S. Cl. .................. 353/34; 353/122; 348/745; 349/57; 359/197; 359/209

(58) Field of Classification Search ............... 353/28, 353/69, 30, 82, 88–92, 94, 97, 101, 122, 353/34; 348/745, 747, 771, 792, 828; 359/197–200, 359/209, 210, 212–214, 220, 221, 223; 349/57; G03B 27/26

See application file for complete search history.

(56) References Cited

U.S. PATENT DOCUMENTS

| 6,574,032 B1 * | 6/2003 | Roddy et al. ............... 359/290 |
| 7,046,407 B2 * | 5/2006 | Conner ........................ 359/15 |
| 2002/0075786 A1 * | 6/2002 | Ikegame ..................... 369/221 |
| 2003/0042801 A1 * | 3/2003 | Miyajima et al. ............. 310/36 |
| 2004/0174757 A1 * | 9/2004 | Garverick et al. .......... 365/200 |
| 2005/0243290 A1 * | 11/2005 | Gupta ......................... 353/99 |

FOREIGN PATENT DOCUMENTS

| JP | 04-043672 | 2/1992 |
| JP | 04-104278 | 4/1992 |

* cited by examiner

*Primary Examiner*—W. B. Perkey
*Assistant Examiner*—Andrew T Sever
(74) *Attorney, Agent, or Firm*—Birch, Stewart, Kolasch & Birch, LLP

(57) ABSTRACT

A concept of improving a resolution by using human's visual characteristics is provided. An image can be displayed at a more improved resolution than an actual physical resolution, thereby obtaining the same effect that the resolution is physically improved. An image signal corresponding to one frame is split into a first image signal and a second image signal, and a first image and a second image are formed based on the first image signal and the second image signal. Then, the first image and the second image are respectively displayed at a first location and a second location. As a result, a viewer can view the image at an improved resolution.

22 Claims, 17 Drawing Sheets

Image signal of one frame
(T=0~T1)

Odd Data
(T=0)

Even Data
(T=T1)

(T=0~T1)

Image signal of
one frame
(T=0~T1)

(T=0~T1)

Odd Data Image

Even Data Image

DISPLAY DEVICE AND DISPLAY METHOD IN WHICH RESOLUTION IMPROVING APPARATUS IS PROVIDED FOR PROJECT-TYPE DISPLAY DEVICE

This application claims the priority benefit of patent application No. 10-2004-0043641 filed on Jun. 14, 2004 in Republic of Korea, which is hereby incorporated by reference.

BACKGROUND OF THE INVENTION

1. Field of the Invention

The present invention relates to a display device and a display method, and more particularly, to a display device and a display method, in which a resolution improving apparatus is provided to effectively improve a resolution of a projection-type display device.

2. Description of the Related Art

Recently, display devices tend to be lightweight, slim and large-sized. Specifically, large-screen display devices have become important in the display fields.

With the advent of digital broadcasting, a projection-type display device requires a high resolution.

SUMMARY OF THE INVENTION

Accordingly, the present invention is directed to a display device and a display method that substantially obviate one or more problems due to limitations and disadvantages of the related art.

An object of the present invention is to provide a display device and a display method, in which a resolution can be effectively improved with a simple structure and operation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device includes: a light source; an image forming unit for forming an image by using a light emitted from the light source and an inputted image signal; a projection unit for projecting the image formed by the image forming unit onto a screen; a movable displacement unit for displacing the image displayed onto the screen; and a signal application unit for applying an input signal to drive the displacement unit in a Fourier series form.

In another aspect of the present invention, a display device includes: a light source; an image forming unit for forming an image by using a light emitted from the light source and an inputted image signal; a projection unit for projecting the image formed by the image forming unit onto a screen; a displacement unit configured to rotate within a predetermined angle in clockwise and counterclockwise directions to periodically displace the image displayed on the screen; and a signal application unit for applying an input signal to drive the displacement unit in a Fourier series form.

In a further another aspect of the present invention, a display device includes: a lamp for emitting a light; a signal processing unit for splitting an image signal of one frame into a first sub image signal and a second sub image signal; an image forming unit for sequentially forming a first image and a second image by using the first sub image signal, the second sub image signal and the light emitted from the lamp; a projection unit for projecting the image formed by the image forming unit onto a screen; a displacement unit configured to rotate within a predetermined angle to displace the image displayed on the screen; and a signal application unit for applying an input signal to drive a driving waveform of the displacement unit in a third-order or higher Fourier series form, depending on the sub image signals sequentially inputted from the signal processing unit.

In a still further another aspect of the present invention, a display method includes the steps of: inputting an image signal having a plurality of frames; splitting a sequentially inputted image signal of one frame into a plurality of sub image signals; sequentially inputting the plurality of split sub image signals to form a plurality of images; applying an input signal to an image displacement unit to display the plurality of images at different locations on a screen; driving the image displacement unit in a driving waveform of a Fourier series form, depending on the input signal; and projecting the images passing through the image displacement unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

A resolution is the number of pixels per square inch on a display device. That is, the resolution is used as a scale representing precision in displaying an image.

In order to improve the resolution, a conventional display device uses a physical method of increasing the number of pixels. However, the present invention improves the resolution by using human's visual characteristics.

According to the present invention, an image can be viewed at a more improved resolution compared with an actual physical resolution, thereby obtaining the same effect that the resolution is physically improved.

Although described below in detail, an image signal corresponding to one frame is split into sub images, e.g., a first image signal and a second image signal. The first image signal and the second signal are respectively displayed as a first image and a second image at a first position and a second position of a screen, such that a viewer feels as if the resolution is improved.

For example, the first position and the second position on the screen may have a gap less than or greater than a size of one pixel and may be spaced apart in a vertical, horizontal or diagonal direction.

Specifically, according to the present invention, an optical path changing unit is used to make the first image and the second image to be displayed respectively at the first position and the second position of the screen.

The optical path changing unit uses a light transmitting element and the optical path is changing depending on the displacement position and displacement angle of the light transmitting element.

Figure 1:
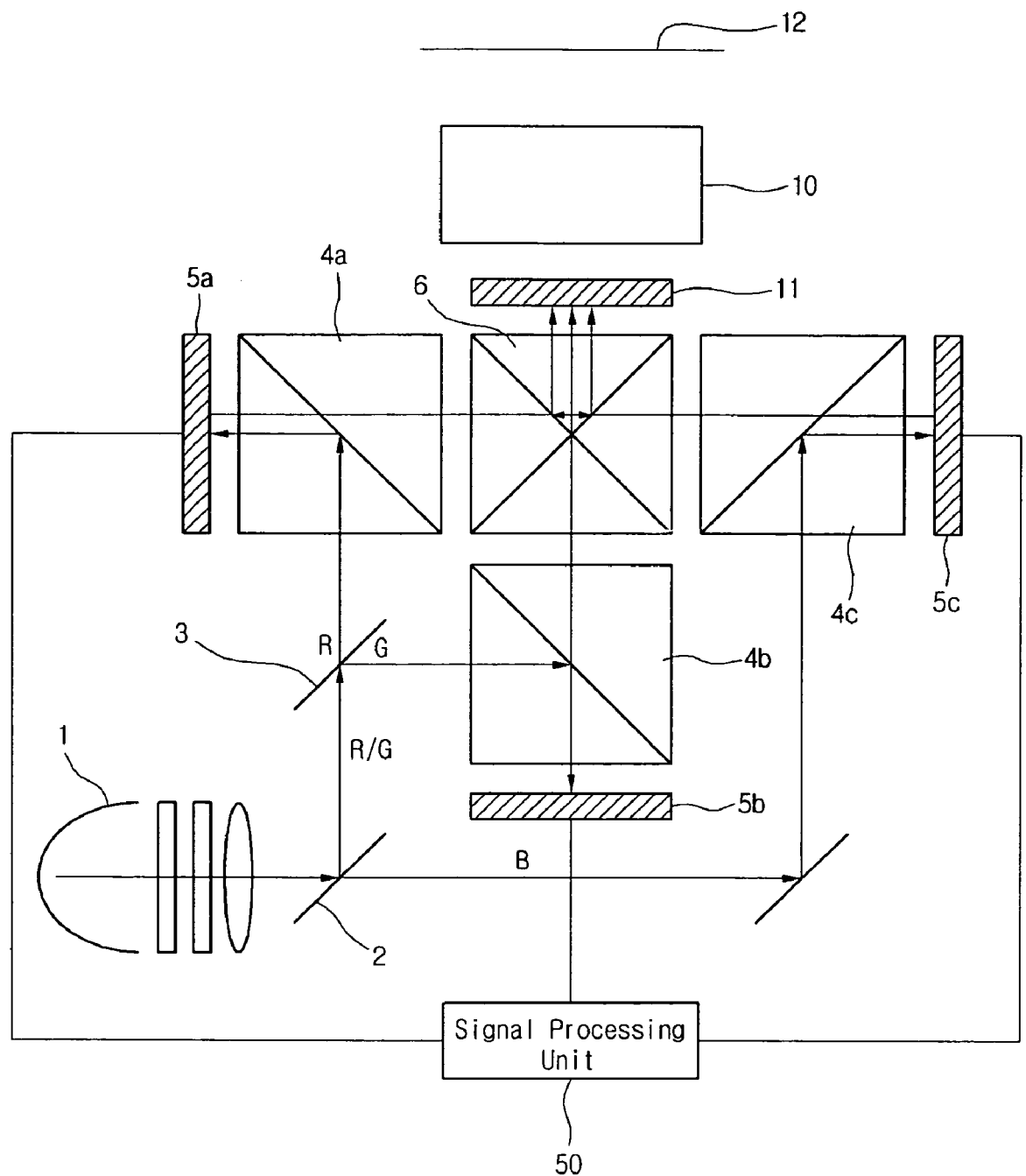
FIG. 1 is a view of a display device having a resolution improving apparatus according to an embodiment of the present invention.

FIG. 1 is a view of a display device having a resolution improving apparatus according to an embodiment of the present invention. All the components of the display device are operatively coupled.

In FIG. 1, there is shown an illuminating system of a projection TV using a reflection-type liquid crystal display (LCD). In the reflection-type illuminating system of a 3 PBS (polarized beam splitter) system shown in FIG. 1, a light irradiated from a lamp 1 passes through a condensing lens and is incident on a first dichroic mirror 2. The first dichroic mirror 2 reflects red and green lights R and G and transmits a blue light B.

Then, the reflected red and green lights R and G are incident on a second dichroic mirror 3. The second dichroic mirror 3 transmits the red light R to a first PBS 4a and reflects the green light G onto a second PBS 4b. The blue light B from the first dichroic mirror 2 impinges on a third PBS 4C, e.g., through a reflecting mirror. As a result, the red, green and blue lights R, G and B are respectively incident on the first, second and third PBSs 4a, 4b and 4c, which are disposed respectively in front of first, second and third LCD panels 5a, 5b and 5c.

The red, green and blue lights R, G and B incident on the first, second and third PBSs 4a, 4b and 4c are reflected and then incident on the first, second and third LCD panels 5a, 5b and 5c, respectively. Phases of the red, green and blue lights R, G and B are changed respectively by the first, second and third LCD panels 5a, 5b and 5c. Then, the red, green and blue lights R, G and B having the changed phases are reflected from the LCD panels 5a, 5b and 5c and transmitted respectively through the first, second and third PBSs 4a, 4b and 4c.

Images are displayed on the first, second and third LCD panels 5a, 5b and 5c, depending on image signals inputted from a signal processing unit 50.

The red, green and blue images, transmitted through the first, second and third LCD panels 5a, 5b and 5c and then through the first, second and third PBSs 4a, 4b and 4c, are combined by an X-prism 6. Then, the combined images pass through a displacement plate 11 and are incident on a projection lens 10.

The images passing through the projection lens 10 are then projected onto a screen 12.

At this point, the displacement plate 11 may be disposed between the X-prism 6 and the projection lens 10, or between the projection lens 10 and the screen 12.

The displacement plate 11 is a thin-plate shaped element that can transmit light. A higher resolution can be implemented by changing the displacement position or angle of the displacement plate 11.

In addition, although the illuminating system using the reflection-type LCD, the dichroic mirror and the PBSs is shown in FIG. 1, a transmission-type LCD instead of the reflection-type LCD can also be used. A liquid crystal on silicon (LCoS) can also be used as the reflection-type LCD.

Further, although three LCD panels are shown in FIG. 1, only one LCD panel can also be used and a structure of the optical system can be variously modified.

Furthermore, the present invention can be applied to a projector as well as a projection TV.

That is, the present invention may be embodied in many different forms and should not be construed as being limited to the embodiments set forth herein.

Figure 2:
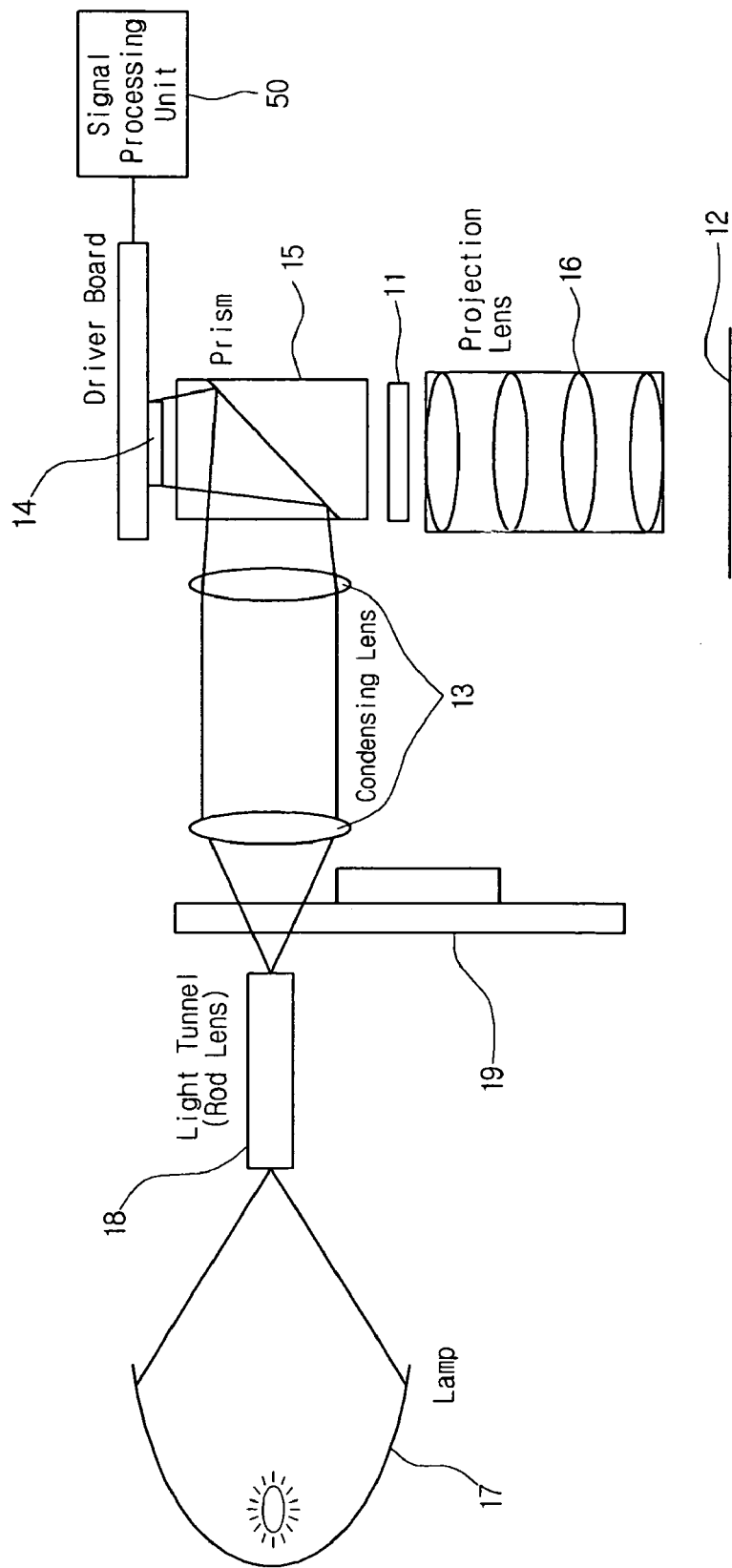
FIG. 2 is a view of a display device having a resolution improving apparatus according to another embodiment of the present invention.

FIG. 2 is a view illustrating a display device according to another embodiment of the present invention. More specifically, a digital light processing (DLP) optical system according to the present invention will be described below in detail with reference to FIG. 2. All the components of the display device of FIG. 2 are operatively coupled.

The DLP optical system provides light to be irradiated to a digital micromirror device (DMD) 14 and determines whether to allow respective micromirrors in the DMD 14 to irradiate the light to a screen in an on-state or to irradiate the light to a non-screen in an off-state, depending on image signals from a signal processing unit 50.

Referring to FIG. 2, the DLP optical system includes a lamp 17, a rod lens 18, a color wheel 19, a condensing lens 13, a prism 15, a DMD 14, a displacement plate 11, and a projection lens 16. The lamp 17 generates light and the rod lens 18 transmits the light generated from the lamp 17. The color wheel 19 splits a white light passing through the rod lens 18 into red, green and blue lights. The condensing lens 13 condenses the lights passing through the color wheel 19 and the prism 15 reflects the condensed lights onto the DMD 14. The DMD 14 irradiates the reflected lights towards a screen 12. The displacement plate 11 displaces the light reflected from the DMD 14, depending on time. The projection lens 16 magnifies the lights passing through the displacement plate 11 and projects the magnified lights onto a screen 12.

Based on such a structure, an operation of the DLP optical system will be described below. A white light emitted from the lamp 17 is focused by an inner curvature of a reflector and the focused light passes through a light tunnel or rod lens 18.

The rod lens 18 is provided by attaching four small and elongated mirrors to one another. The light passing through the rod lens 18 is scattered and reflected such that brightness is uniformly distributed.

The brightness of light that will be finally projected onto the screen 12 needs to be uniform. The rod lens 18 performs this function so that it is an important optical element in a projection-type display device.

The light passing through the rod lens 18 is transmitted through the color wheel 19 for the color separation. The color wheel 19 rotates according to a vertical synchronization of the image.

Then, the light passes through the condensing lens 13 and is reflected by the prism 15, so that the light is directed to the DMD 14. The prism 15 can totally reflect or transmit the light, depending on an incident angle of the light.

The light incident on the DMD 14 is redirected toward the screen 12, depending on the on/off state of the micromirrors of the DMD 14 controlled in response to sampled pixel values. The DMD 14 changes into the on- or off-state depending on the image signals inputted from the signal processing unit 50. In this manner, a predetermined image is formed.

The image reflected from the DMD 14 and directed to the screen 12 passes through the displacement plate 11 and the projection lens 16. In this course, the image is enlarged and projected onto the large screen 12.

The displacement plate 11 may be disposed between the prism 15 and the projection lens 16, or between the screen 12 and the projection lens 16. Also, the displacement plate 11 may be disposed between the DMD 14 and the prism 15.

The light is projected onto different locations on the screen 12 depending on the periodical change in the position and/or angle of the displacement plate 11.

According to the embodiments of FIGS. 1 and 2, the displacement plate 11 may be disposed at a predetermined position between the screen and the image forming unit for forming the image through the R, G and B combination.

In the image forming unit shown in FIGS. 1 and 2, the image signal corresponding to one frame is split into the first image signal and the second image signal by the signal processing unit. Then, the first image signal and the second image signal are transformed as the first image and the second image by the R, G and B combination, respectively.

In FIG. 1, the image forming unit may be provided with the first, second and third LCD panels 5a, 5b and 5c, the first, second and third PBSs 4a, 4b and 4c and the X-prism 6.

In FIG. 2, the image forming unit may be provided with the color wheel 19, the condensing lens 13 and the DMD 14.

That is, the image signal corresponding to one frame is split into a plurality of image signals and processed into a plurality of images and then displayed. In this manner, the image signal corresponding to one frame may be split into "n" image signals and processed into "n" images and then displayed at "n" or less different positions on the screen.

According to the present invention, a display time of one image is equal to a time given by dividing a display time of one frame image by the number of images.

The present invention makes the viewer feel as if the resolution is improved by splitting the image signal corresponding to one frame into the first image signal and the second image signal, processing the first image signal and the second image signal into the first image and the second image and then sequentially displaying the first image and the second image at first and second positions of the screen by the operation of the displacement plate 11.

Figure 3:
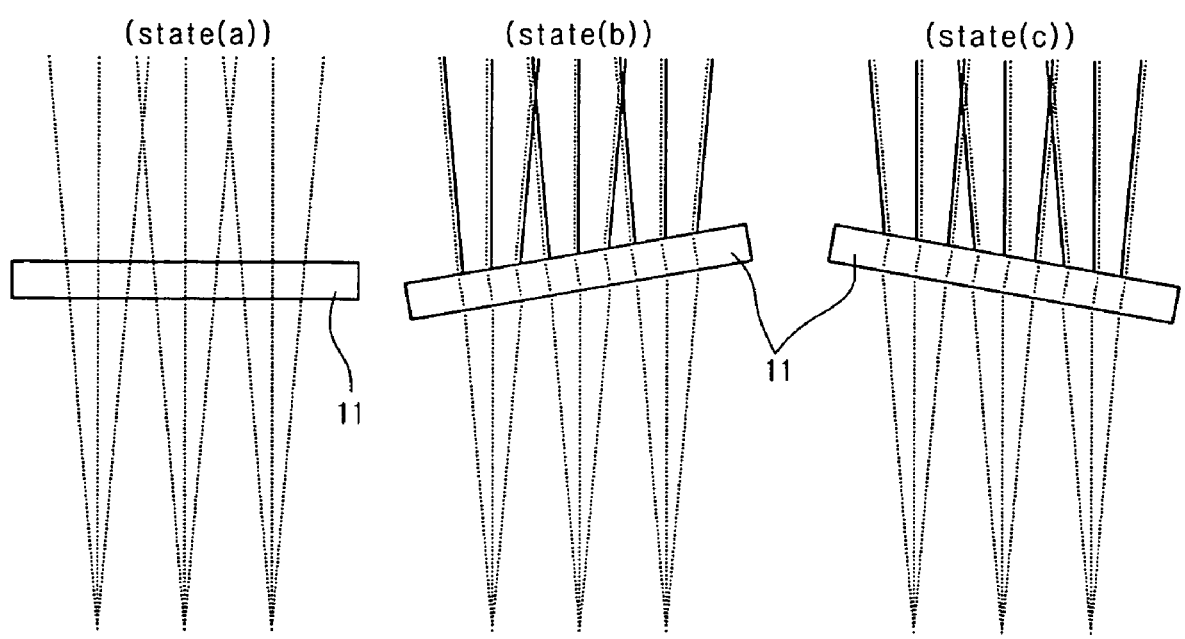
FIGS. 3(a)-3(c) are views illustrating an operation of a displacement plate in the display device according to the present invention.

FIG. 3 is a view illustrating an operation of the displacement plate 11 in the display device according to the present invention.

Particularly, FIG. 3(a) shows a case that there is no displacement plate 11 or there is no motion of the displacement plate 11. In this case, the image projected from the prism or the projection lens is displayed at the same position of the screen.

FIG. 3(b) shows a case that the displacement plate 11 is rotated in a counterclockwise direction, and FIG. 3(c) shows a case that the displacement plate 11 is rotated in a clockwise direction. If the displacement plate 11 changes from the state (a) to the state (b) or (c), the image is refracted while passing through the displacement plate 11, such that the image is displayed onto a different position of the screen. In the presentation, the displacement plate 11 may oscillate between the state (a) and the state (b) or (c).

That is, since the displacement plate 11 is operated as an optical path changing unit, the projected image is displaced due to the displacement plate 11 and is thus displayed onto a different position of the screen depending on the motion of the displacement plate 11.

Thus, the displacement plate 11 according to the present invention acts as the image displacement unit to make the image to be displayed onto different positions of the screen.

Figure 4:
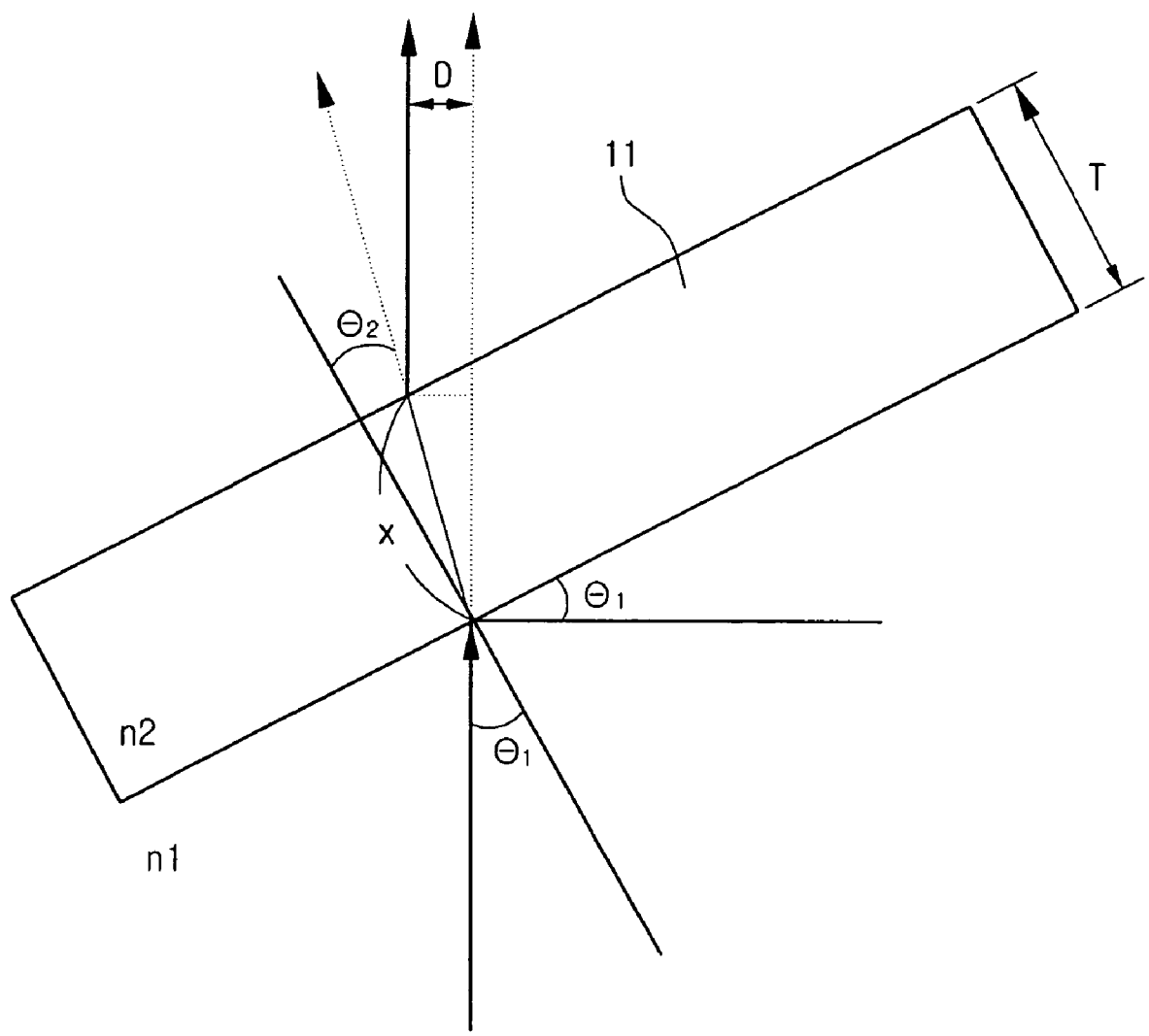
FIG. 4 is a view illustrating an operation principle of the displacement plate acting as an image displacement unit in the display device according to the present invention.

FIG. 4 is a view illustrating an operation principle of the displacement plate acting as an image displacement unit in the display device according to the present invention.

A motion degree of the light on the screen 12 can be calculated depending on the displacement plate's thickness T, tilt angle (light incident angle) $\theta_1$ and refractive index $n_2$. The displacement plate's thickness, tilt angle and refractive index can be determined depending on the required motion degree of the light on the screen 12.

The displacement plate's thickness, tilt angle and refractive index can be derived from Snell's law given by Equation 1 below.

$$n_1 \sin\theta_1 = n_2 \sin\theta_2 \quad \text{[Equation 1]}$$

where, $n_1$ is the refractive index of air;
$n_2$ is the refractive index of the displacement plate;
$\theta_1$ is the incident angle of light; and
$\theta_2$ is the refraction angle of light.

Thus, the optical path difference D between the lights passing through the displacement plate 11 can be given by Equation 2 below.

$$D = \frac{T}{\cos\theta_2}\sin(\theta_1 - \theta_2) \quad \text{[Equation 2]}$$

$$\cos\theta_2 = \frac{T}{x}, \ \sin(\theta_1 - \theta_2) = \frac{D}{x}, \ \theta_2 = \sin^{-1}\left(\frac{n_1 \sin\theta_1}{n_2}\right)$$

where T is the thickness of the displacement plate;

$n_1$ is the refractive index of air;

$n_2$ is the refractive index of the displacement plate;

$\theta_1$ is the incident angle of light;

$\theta_2$ is the refraction angle of light; and x is the length of the optical path of the refracted light within the displacement plate.

In addition, the optical path difference D between the lights passing through the displacement plate 11 determines the displacement of the lights actually displayed onto the screen 12, depending on the magnification of the projection lens.

It is preferable that the refractive index of the displacement plate 11 falls within the range from 1.4 to 2.0.

The present invention according to an embodiment uses the light transmitting element and the light refraction so as to make the optical path difference D. On the other hand, a reflection mirror may be used to change the optical path. That is, if the reflection angle of the light is changed, the optical path of the reflected light can be changed depending on the angles of the reflection mirror as disposed on the optical path.

According to the method of changing the optical path using the reflection, the change in the optical path is sensitive to the change in the angle of the reflection mirror, compared with the method of changing the optical path using the light refraction. Therefore, a precise control is required if the reflection is used to change the optical path.

According to the present invention, the displacement degree of the image may be more than or less than a size of one pixel. However, since the displacement degree of the image is small, the optical path changing unit must be precisely controlled so that the image projected from the projection lens can be displaced within a small range.

Therefore, the optical path changing unit using the light transmitting element has advantages in that it can be easily manufactured and the error probability is greatly reduced.

Specifically, as shown in FIG. 4, if the light is incident onto the same position of the light transmitting element, the optical path difference D occurs but the traveling direction does not change.

In the case of the reflection mirror, even if the light is incident onto the same position of the reflection mirror, the traveling direction of the light is changed depending on the angles of the reflection mirror, such that a more precise control is required.

FIGS. 5(a)-6(b) are views illustrating different examples of the displacement of lights projected onto the screen depending on the motion of the displacement plate in the display device according to the present invention.

Figure 5A:
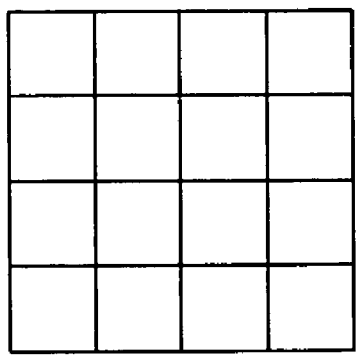
FIGS. 5(a)-5(c) and 6(a)-6(b) are views illustrating different examples of a displacement of light projected onto a screen depending on the motion of a displacement plate in the display device according to the present invention.
Figure 5B:
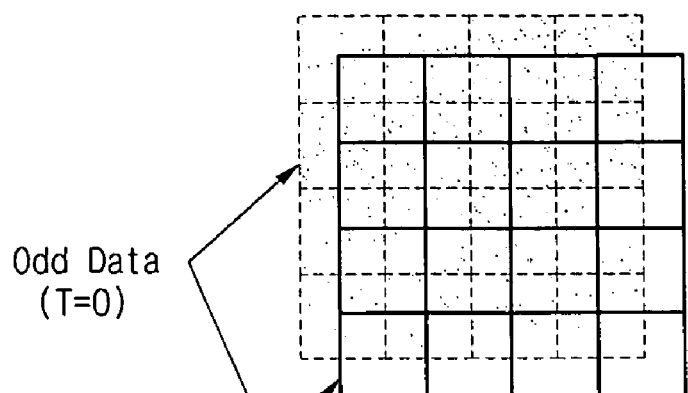
Figure 5C:
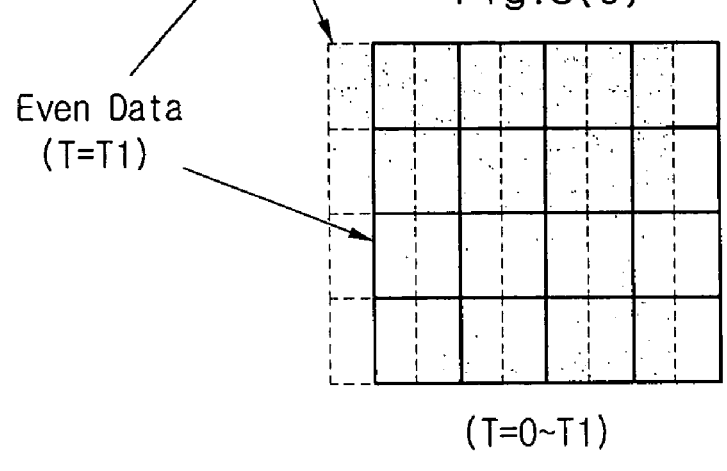

Referring to FIGS. 5(a)-5(c), in the display device having a rectangular pixel structure, the displacement plate 11 periodically moves and thus the positioning of the image on the screen 12 moves.

Referring to a conventional pixel structure of FIG. 5(a) the same image is displayed at the same corresponding positions on the screen during a predetermined time (T=0-T1). However, referring to FIGS. 5(b) and 5(c), different images are displayed at different positions on the screen at time T=0 and T=T1 due to the movement of the displacement plate 11. Thus, a double resolution can be recognized using the same number of pixels.

For example, the image signal of one frame is split into the first and second image signals. Then, when the image of one frame is to be displayed, the first and second image signals are combined and displayed in sequence.

For example, assume that the same image information is displayed during 1/60 second in the related art. According to the present invention, the image information is split into a first image information and a second image information, and then the first image information and the second image information are respectively displayed at the first and second positions on the screen, each image information for 1/120 second.

Figure 7A:
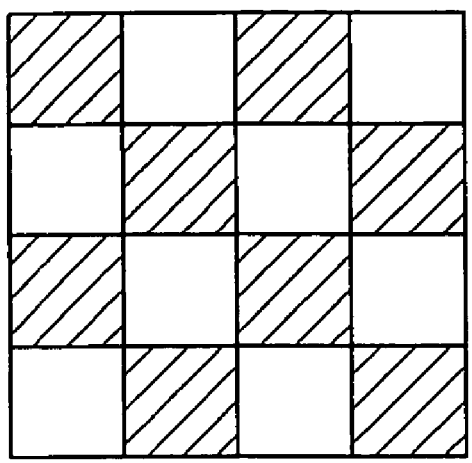
FIGS. 7(a)-7(b) are respectively the views of a first image and a second image displayable using the display device according to the present invention.
Figure 7B:
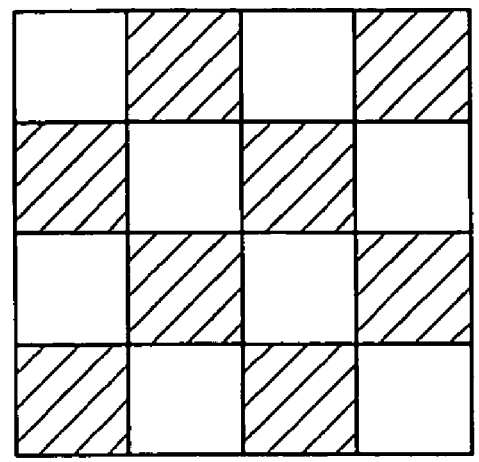

FIGS. 7(a) and 7(b) are respectively the exemplary views of a first image and a second image split from the image corresponding to one frame according to the present invention.

As shown in FIGS. 7(a) and 7(b), the image corresponding to one frame can be split into the first image (e.g., odd data as in FIG. 7(a)) and the second image (e.g., even data as in FIG. 7(b)), and the first image and the second image can be split depending on the positions of the pixels.

The positions at which the first image (odd data) and the second image (even data) are displayed can be displaced by the displacement plate 11.

Returning to FIG. 5(b), in one example, the display positions of the first image (odd data) and the second image (even data) are displaced in a diagonal direction. In another example as shown in FIG. 5(c), the display positions of the first image (odd data) and the second image (even data) are displaced in a horizontal direction.

Figure 6A:
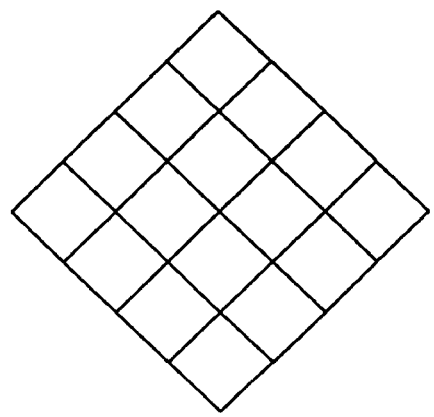
Figure 6B:
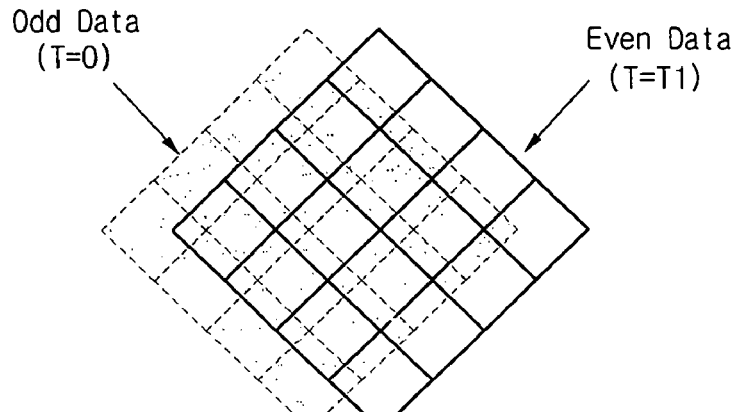

FIGS. 6(a) and 6(b) show the position of the image displayed onto the screen depending on time in a rhombus pixel structure according to the present invention.

Referring to a conventional pixel structure of FIG. 6(a), the same image is displayed at the same position during a predetermined time (T=0-T1). However, referring to FIG. 6(b), different images are displayed at different positions of the screen at time T=0 and T=T1. Thus, according to the present invention, a double resolution can be recognized using the same number of pixels.

Figure 8:
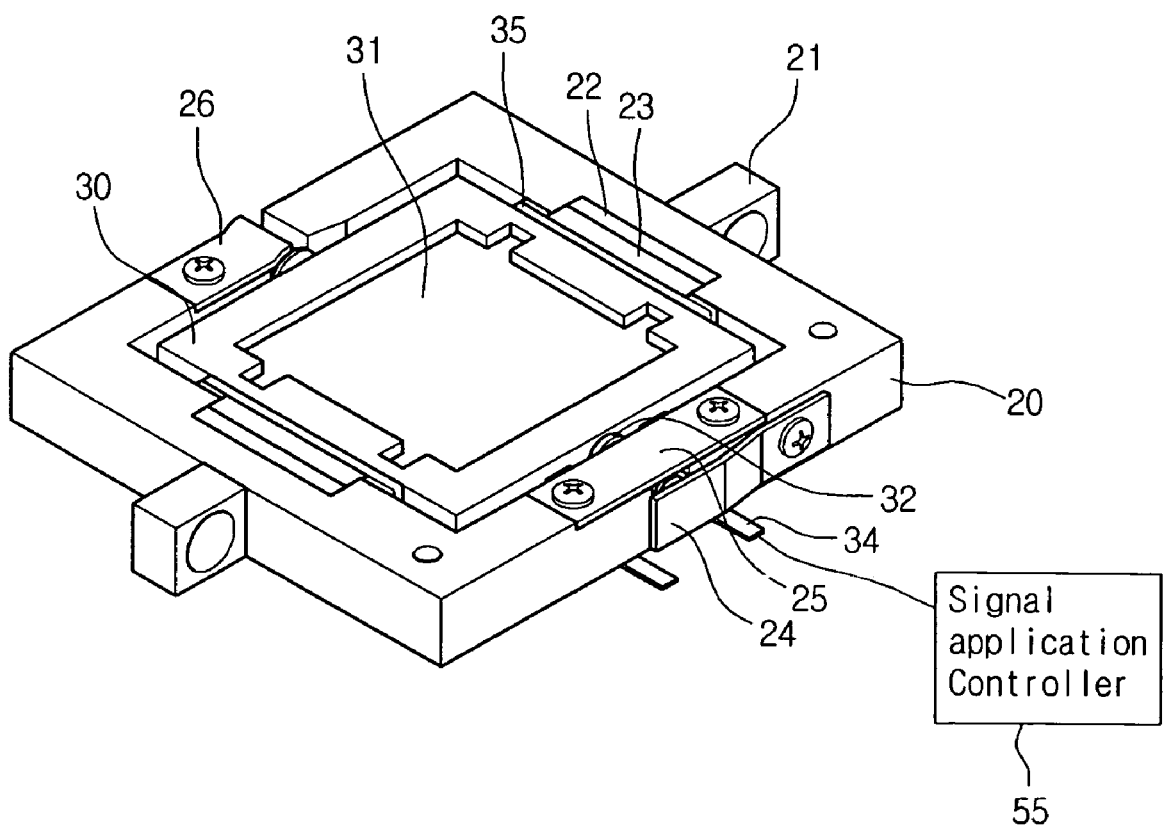
FIG. 8 is a perspective view of a resolution improving apparatus according to the present invention.
Figure 9:
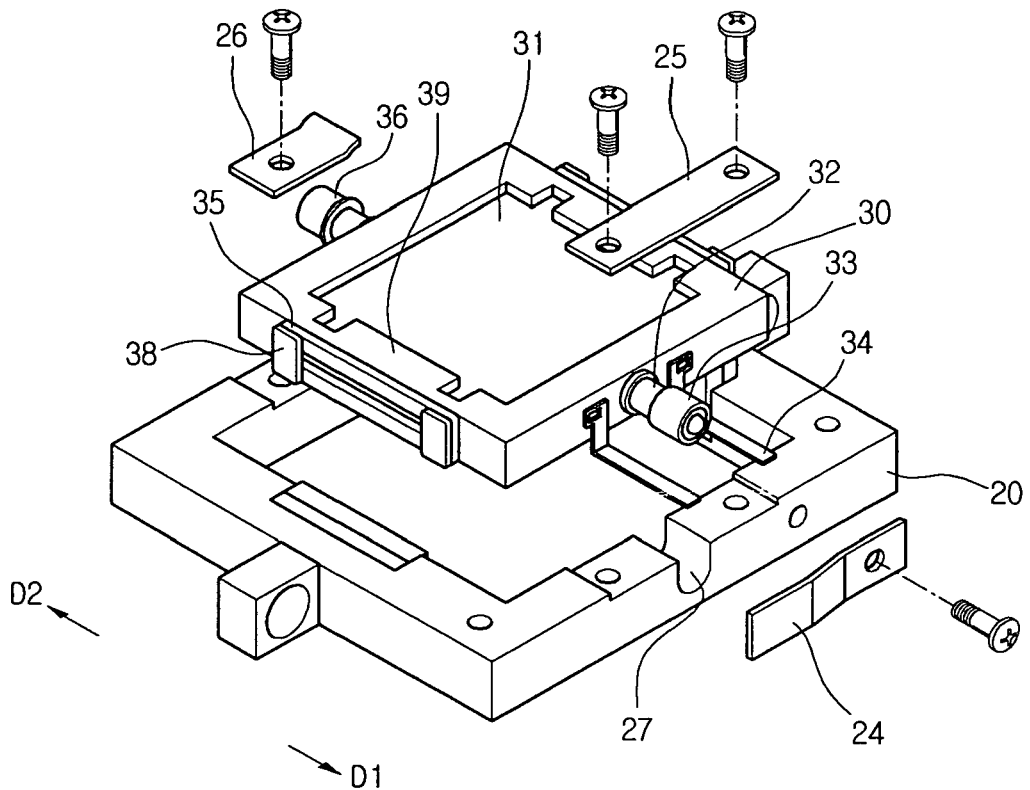
FIG. 9 is an exploded perspective view of the resolution improving apparatus shown in FIG. 8.
Figure 10:
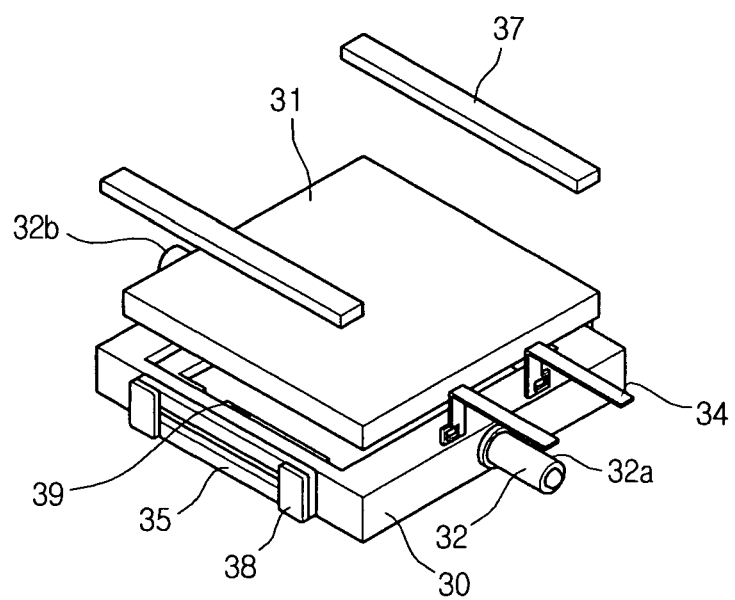
FIG. 10 is a bottom exploded perspective view of a rotating member of the resolution improving apparatus of FIG. 8 according to the present invention.
Figure 11:
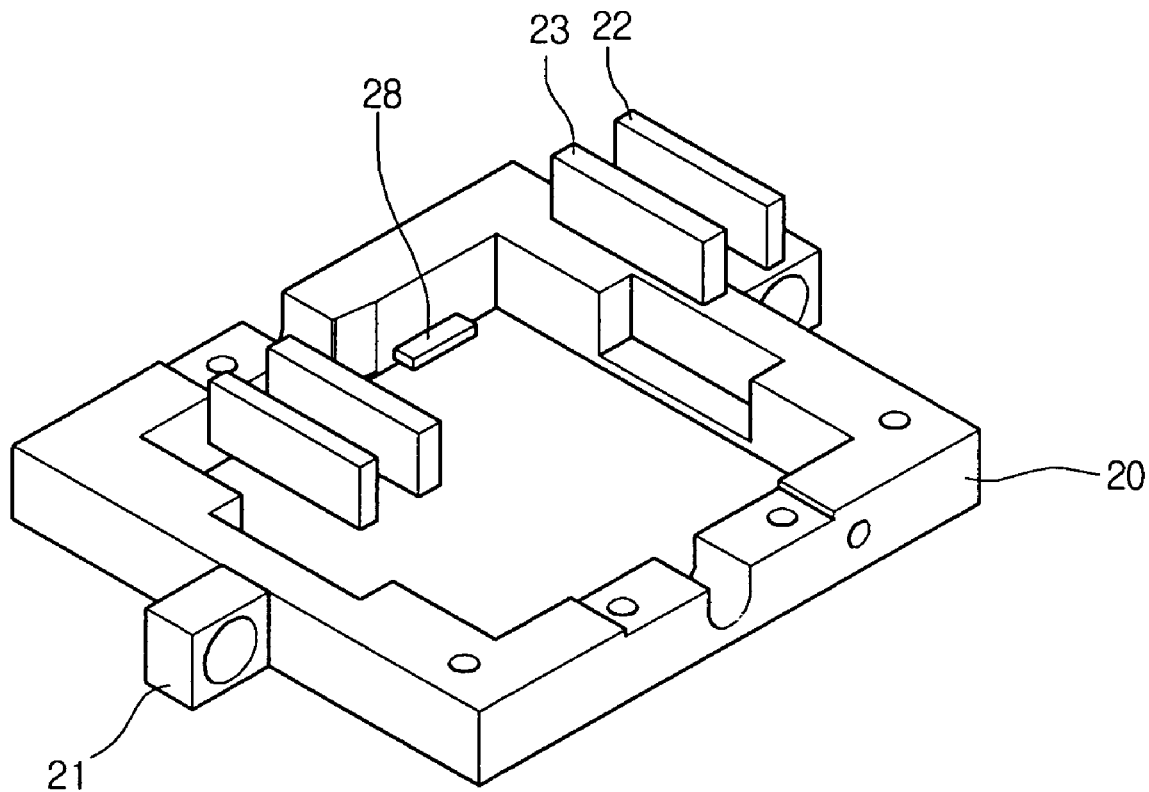
FIG. 11 is an en exploded perspective view of a fixing member of the resolution improving apparatus of FIG. 8 according to the present invention.
Figure 12:
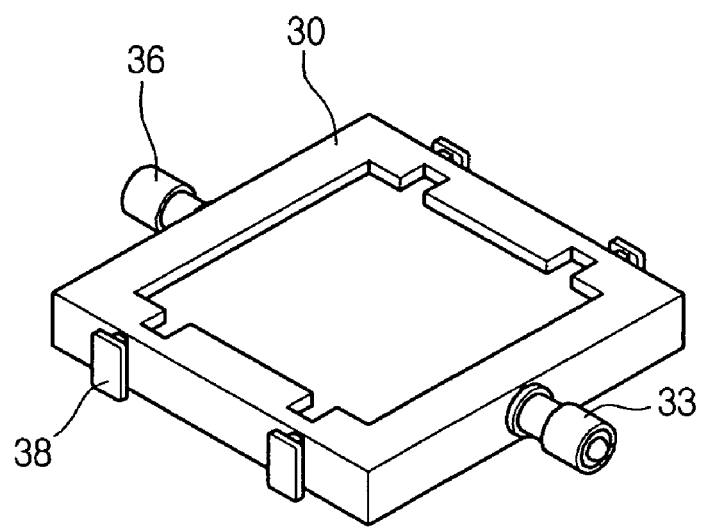
FIG. 12 is a view of a coil holder disposed at the rotating member of FIG. 10 according to the present invention.

FIG. 8 is a perspective view of a resolution improving apparatus according to the present invention, and FIG. 9 is an exploded perspective view of the resolution improving apparatus shown in FIG. 8. FIG. 10 is a bottom exploded perspective view of a rotating member of the resolution improving apparatus in FIG. 8 according to the present invention, FIG. 11 is an en exploded perspective view of a fixing member of the resolution improving apparatus in FIG. 8 according to the present invention, and FIG. 12 is a top perspective view of the rotating member of FIG. 10 according to the present invention. This resolution improving apparatus can be implemented in the display device of FIGS. 1 and 2 or other suitable device. For instance, the displacement plate 11 of FIGS. 1 and 2 can be displacement plate 31 of FIG. 8.

Referring to FIGS. 8 to 12, the resolution improving apparatus includes a fixing member 20 and a rotating member 30, all operatively coupled.

The fixing member 20 is disposed on an optical path between an image forming unit and a screen and has a fixing part 21 at one or more sides thereof. Although a screw hole is shown in the drawings, other members can also be used to fix the fixing member within the display device. The fixing member 20 is firmly fixed to the display device on the optical path.

In addition, a magnet 23 and a yoke 22 are formed at one or more sides of the fixing member 20. Preferably, the magnet 23 and the yoke 23 can be formed on one side or both (opposite) sides of the fixing member 20. Here, the magnet 23 may be a dipole magnet having N and S poles. Also, the magnet 23 may be a monopole magnet or a multiple magnet. The magnet 23 drives the rotating member 30 by using a magnetic field. The yoke 23 forms a passage of a magnetic field to increases an efficiency of a magnetic field.

The rotating member 30 is rotatably coupled within the fixing member 20. The rotating member 30 is formed in a rectangular or rhombus shape and surrounds the optical path, but can have other shapes and configurations. The rotating member 30 has a structure suitable for fixing a displacement plate 31 thereto.

The displacement plate 31 is a light transmitting element that rotates at a predetermined angle for a short time and changes the position at which an image is displayed. This operation has been already discussed above referring to FIGS. 3(a)-7(b).

For this purpose, the displacement plate 31 may be perpendicular to the optical path or inclined at a predetermined angle. Thus, the incident angle of the light incident on the displacement plate is periodically changed.

The rotating member 30 includes one or more shafts 32 (32a and 32b) on side(s) and is rotatably connected to shaft inserting grooves 27. Preferably, the rotating member 30 further includes first and second bearings 33 and 36. Here, the shafts 32 serve as a rotation center axis of the rotating member 30 or the displacement plate 31, and the rotation center axis is perpendicular to the optical path.

The first bearing 33 is formed in an approximately cylindrical shape and the first shaft 32a is inserted into the first bearing 33. The firs bearing 33 is disposed on the shaft inserting groove 27 of the fixing member 20.

The second bearing 36 is disposed on the second shaft 32b and makes an outer diameter of the shaft 32b so large that the rotating member 30 (shaft 32b) can be caught by an inner surface of the groove 27 in the fixing member 20.

For instance, the rotating member 30 that is inserted into the fixing member 20 cannot move in a left direction (D2 in FIG. 9) due to the second bearing 36. Also, a leaf spring 24 is formed at a right side of the first bearing 33, such that the rotating member 30 cannot move or is restricted from moving in a right direction (D1 in FIG. 9). But, an elasticity of the leaf spring 24 allows a certain proper motion while restricting some other motion of the rotating member, such that the rotating member 30 can rotate smoothly only in the desired direction(s) as needed to rotate/displace the displacement plate 31.

In such a state that only one end of the leaf spring 24 is coupled to the fixing member 20, the leaf spring 24 supports the rotating member 30.

A first cover 25 and a second cover 26 are disposed on upper sides of the first and second bearings 33 and 36 so that the rotating member 30 cannot be released upwardly.

The first cover 25 is coupled to the rotating member 30 by two screws, and the second cover 26 is partially coupled to the rotating member 30 by one screw. It aims to secure a proper motion in order for the rotating member 30 to rotate smoothly only in the desired direction(s).

The second cover 26 has a proper elastic force and its operation is similar to the operation of the leaf spring 24. In other words, the second cover 26 serves as an elastic member that can secure the rotating member to the fixing member 20 while allowing a certain proper motion of the rotating member 30.

A coil 35 is provided at a side of the rotating member 30, that is, a side opposing to the magnet 23 formed at the fixing member 20.

Referring to FIG. 12, in order to easily install the coil 35, a coil holder 38 is provided at one or more sides of the rotating member 30, such that the coil 35 is supported and fixed by the coil holder 38. The coil 35 is formed in a rectangular shape or a racetrack shape or other suitable shape/configuration. Thus, the rotating member 30 can move around the magnet 23 along a direction of a current.

When a power is supplied to the coil 35 through a power line 34, a current flows through the coil 35 and thus an attractive force and a repulsive force are generated due to an interaction with the magnet 35 provided at the fixing member 20, thereby rotating or oscillating the rotating member 30 and thus the displacement plate 31. The power supply control of the power line 34 can be done by the signal processing unit 50, and/or other controller (e.g., a signal application controller 55 in FIG. 8) in the display device. The power supply control is made in such a manner that the resolution improving principles set forth above in FIGS. 5(a)-7(a) can be realized. In this example, the rotating member 30 rotates about the rotation center axis in a clockwise or counterclockwise direction depending on the direction of the current applied to the coil 35. However, the resolution improving apparatus can be configured to move/rotate the plate 31 in any desired direction.

According to another embodiment, a magnet may be provided at a side of the rotating member. In this embodiment, a coil holder is provided at a side of the fixing member and opposing the magnet, and a coil is supported by the coil holder.

Returning to FIG. 10, the displacement plate 31 is coupled to the rotating member 30. The displacement plate is positioned on a protrusion 39 formed at an inner surface of the rotating member 30, and then fixed by a supporting member 37. A detail shape of the protrusion 39 is shown in FIG. 9 as one example.

In another example, the displacement plate 31 may be injected together with the rotating member 30 so that they are formed at the same time. In this case, the displacement plate 31 can be fixed to the rotating member 30 without any additional supporting member 37.

As shown in FIG. 11, a stopper 28 is provided at an inner lower side of the fixing member 20 so as to limit a rotation angle of the rotating member 30. Thus, due to the stopper 28, the rotation range of the rotating member 30 is limited to below a predetermined angle to reduce or eliminate an external impact or an erroneous operation or an excessive operation.

The resolution improving apparatus of the present invention is disposed on the optical path of the display device and is rotated due to the interaction of the coil 35 and the magnet 23 depending on the applied control current.

Preferably, the rotation range of the rotating member 30 can be set within ±0.75°. The rotating member 30 can be rotated such that it periodically oscillates between the first location and the second location.

The rotating member 30 rotates (e.g., a full oscillation or rotation) at least one time while an image signal of one frame is applied.

Figure 13:
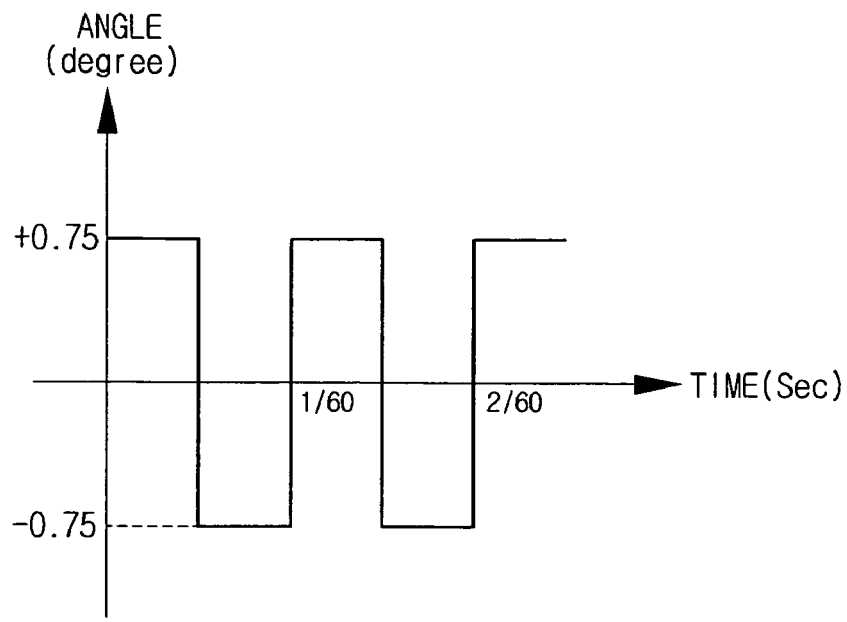
FIG. 13 is a driving waveform of the rotating member disposed at the resolution improving apparatus according to a preferred embodiment of the present invention.

FIG. 13 is an example of a waveform of the rotating member disposed at the resolution improving apparatus according to an embodiment of the present invention.

Referring to FIG. 13, the rotating member 30 is rotated in response to a control signal (e.g., from the signal application controller 55 in FIG. 8) having at least one period while the same image signal is being displayed. Preferably, the rotating member is set to rotate as much as a constant angle (e.g., ±0.75°) in a period of $\frac{1}{60}$ second.

In case where an image of one frame is displayed during 1/60 second, if the rotating member is rotated at the period of 1/60 second, the user can feel the improvement of the resolution as the same image is displayed at different locations (first location, second location) on the screen during this period.

According to an embodiment, it is preferable that the rotating member is rotated in a square waveform for a high-speed rotation.

Figure 14:
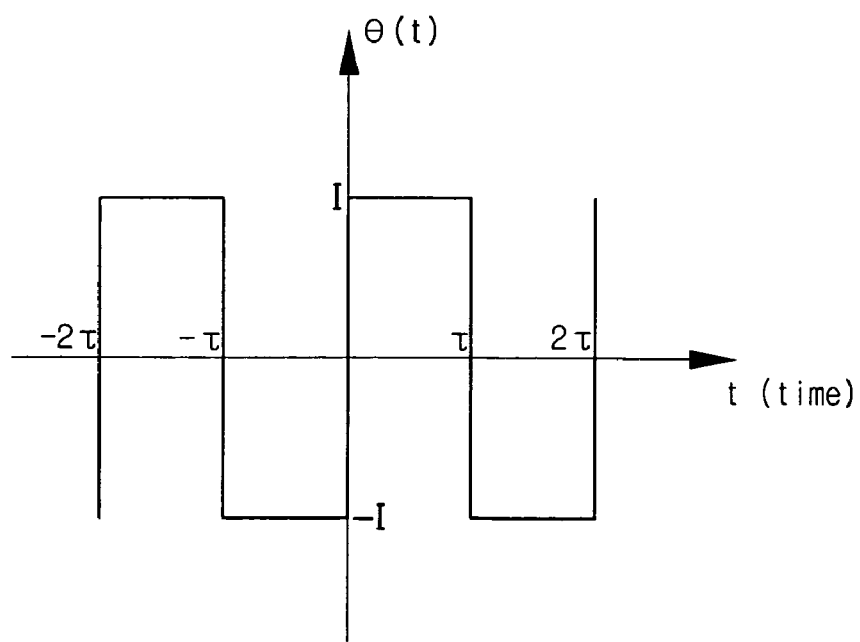
FIG. 14 is a driving waveform of the rotating member disposed at the resolution improving apparatus according to the present invention.

In FIG. 14, a driving waveform (output waveform) e (t) of the rotating member 30 is given by Equation 3 below.

$$\theta(t) = \frac{4I}{\pi}\left(\frac{\sin\frac{\pi}{\tau}t}{1} + \frac{\sin\frac{3\pi}{\tau}t}{3} + \frac{\sin\frac{5\pi}{\tau}t}{5} + \ldots\right)$$
$$= \frac{4I}{\pi}\sum_{n}^{\infty}\frac{1}{n}\sin\frac{n\pi}{\tau}t$$
[Equation 3]

where n=odd integer.

Meanwhile, a forced oscillation is expressed as Equation 4 below.

$$J\theta''(t) + c_\theta \theta'(t) + k_\theta \theta(t) = T(t), \theta(t) = \Theta\sin\omega t, T(t) = T\sin(\omega t + \Phi)$$
[Equation 4]

A frequency response is expressed as Equation 5 below.

$$\frac{\Theta}{T} = \frac{\frac{1}{k_\theta}}{\sqrt{\left(1-\left(\frac{\omega}{\omega_0}\right)^2\right)^2 + \left(2\zeta\frac{\omega}{\omega_0}\right)^2}},$$
$$\phi = \tan^{-1}\frac{2\zeta\frac{\omega}{\omega_0}}{1-\left(\frac{\omega}{\omega_0}\right)^2}$$
[Equation 5]

$\omega_0$ and a damped natural frequency $\zeta$ are given by Equation 6 below.

$$\omega_0 = \sqrt{\frac{k_\theta}{J}}\sqrt{1-\zeta^2}, \zeta = \frac{c_\theta}{2\sqrt{Jk_\theta}}$$
[Equation 6]

An output can be expressed as Equations 7 to 9.

$$\theta_1(t) = \frac{4I}{\pi}\sin\frac{\pi}{\tau}t, \theta_3(t) = \frac{4I}{3\pi}\sin\frac{3\pi}{\tau}t, \theta_5(t) = \frac{4I}{5\pi}\sin\frac{5\pi}{\tau}t, \ldots$$
[Equation 7]

$$\theta_1(t) = \Theta_1\sin\omega_1 t, \theta_3(t) = \Theta_3\sin\omega_3 t, \theta_5(t) = \Theta_5\sin\omega_5 t, \ldots$$
[Equation 8]

$$\theta_m(t) = \Theta_m\sin\omega_m t, m = \text{odd}, \Theta_m = \frac{4I}{m\pi}, \omega_m = \frac{m\pi}{\tau}$$
[Equation 9]

An entire output is a linear combination of the outputs expressed as Equations 7 to 9. Based on Equation 5, each input signal for the respective outputs is expressed as Equations 10 and 11.

$$T_m(t) = T_m\sin(\omega_m t + \phi_m) \text{ where}$$
$$T_m = k_\theta\sqrt{\left(1-\left(\frac{\omega_m}{\omega_0}\right)^2\right)^2 + \left(2\zeta\frac{\omega_m}{\omega_0}\right)^2}\Theta_m$$
$$\omega_m = \frac{m\pi}{\tau}$$
$$\phi_m = \tan^{-1}\frac{2\zeta\frac{\omega_m}{\omega_0}}{1-\left(\frac{\omega_m}{\omega_0}\right)^2}$$
[Equation 10]

$$T(t) = \sum_{m}^{\infty}T_m\sin(\omega_m t + \phi_m)$$
[Equation 11]

Equation 11 represents an input waveform required to obtain the square wave output.

Here, the input waveform was calculated under the condition of 'n=odd integer' in the driving waveform and the present invention can also be applied under the condition of 'n=even integer' in the driving waveform.

That is, although it is assumed that the driving waveform of FIG. 14 start from +I at t=0+, the driving waveform can lead or lag by a predetermined time (for example, a half period). In the case of n=even integer, the driving waveform of FIG. 14 starts from −I at t=0+.

In order to obtain the square wave output of FIG. 14, a linear combination must be created through calculation up to infinite orders. However, the coefficient $T_m$ will be very large in a high-order term and thus an input component (voltage) in this frequency can be considerably increased.

Accordingly, a combination of sinusoidal waves having frequencies of 60 Hz, 180 Hz, 300 Hz, 420 Hz and 540 Hz may be the driving waveform in the case of n=1, 3, 5, 7, 9; and a combination of sinusoidal waves having frequencies of 120 Hz, 240 Hz, 360 Hz and 480 Hz may be the driving waveform in the case of n=2, 4, 6, 8.

In order to obtain a desired driving waveform, it is important to generate an appropriate input waveform. That is, it is preferable to generate the input waveform so that the rotating member can operate in Fourier series form.

FIGS. 15 to 20 are examples of driving waveforms of the rotating member with respect to different input waveforms of the resolution improving apparatus according to the present invention.

Referring to FIGS. 15 to 20, the driving waveforms of the rotating member are different depending on the input waveforms of the resolution improving apparatus. In order for the appropriate driving of the rotating member, the appropriate generation and input of the input waveforms are needed.

Figure 15:
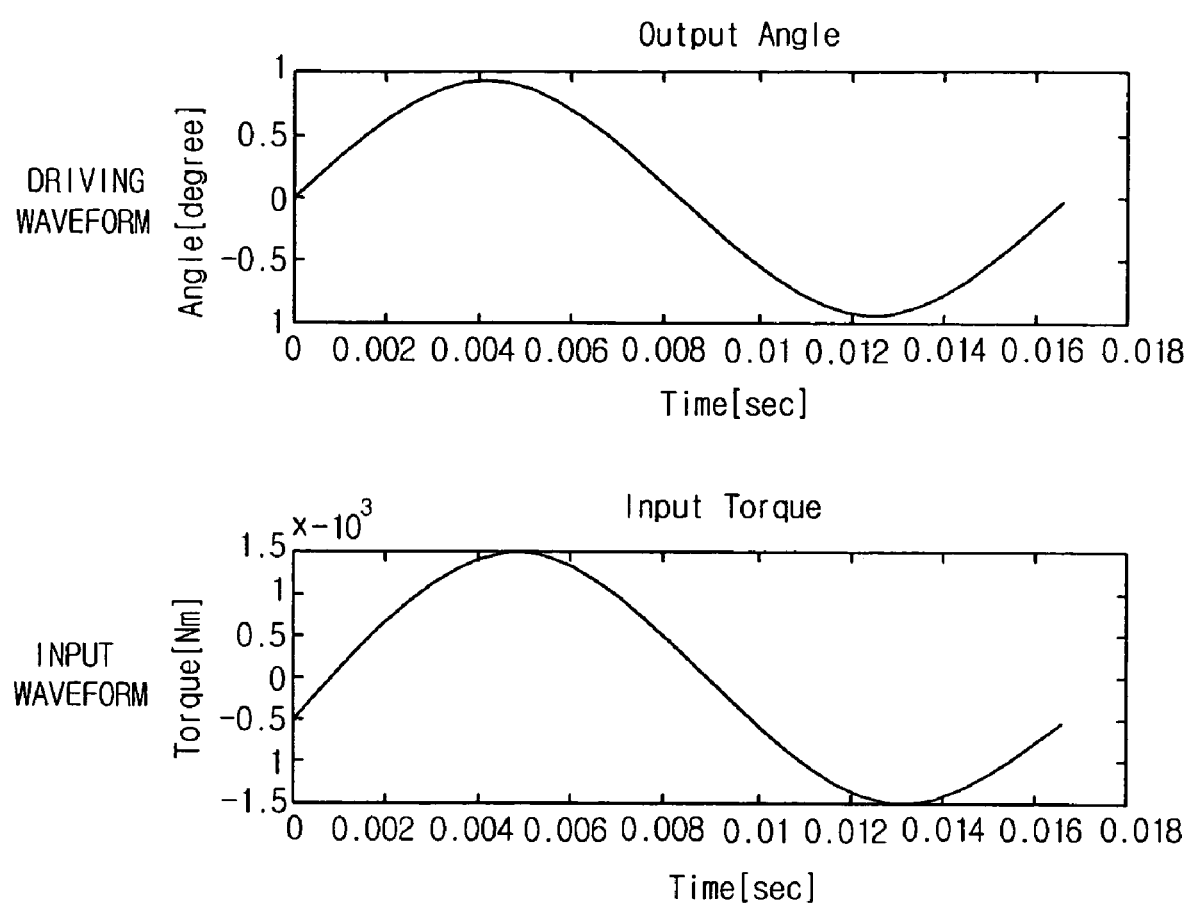
FIGS. 15 to 20 are different examples of driving waveforms of the rotating member with respect to input waveforms of the resolution improving apparatus according to the present invention.
Figure 16:
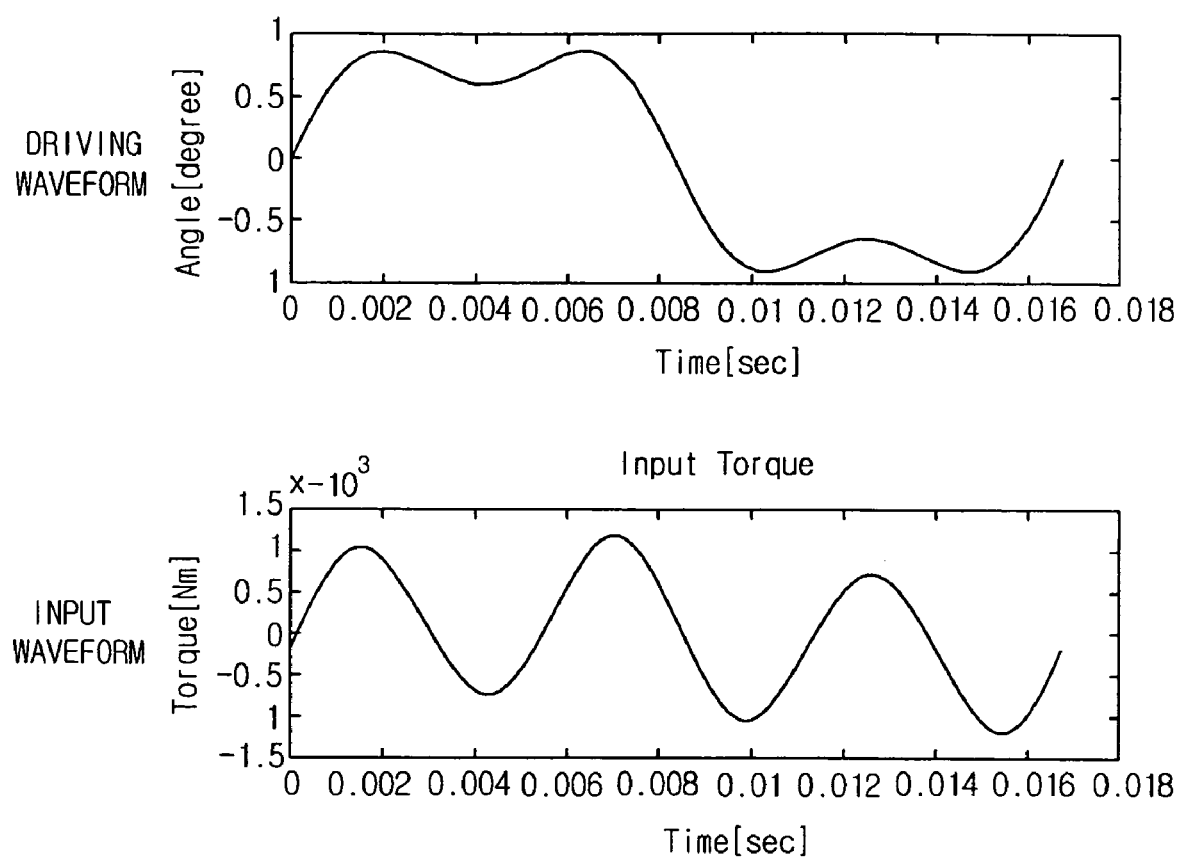
Figure 17:
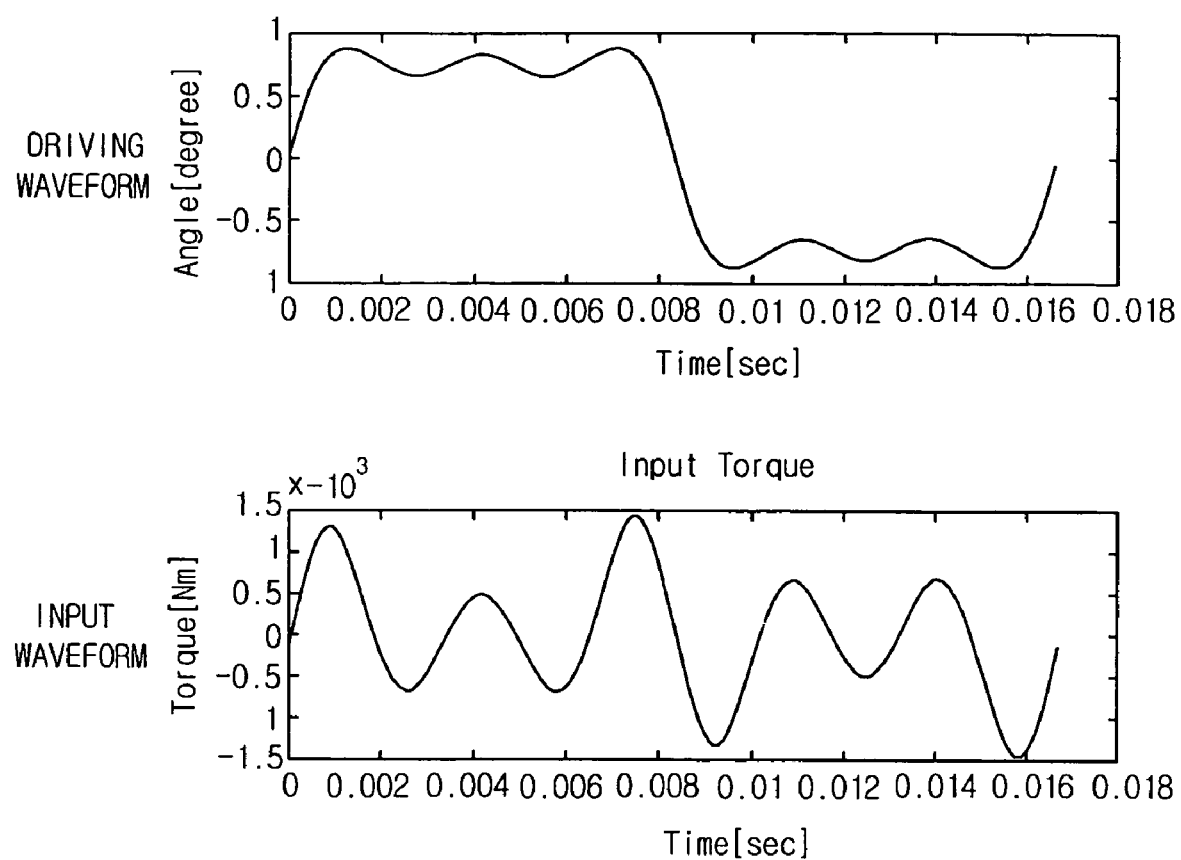

In FIG. 15, the driving waveform (output waveform) of the rotating member is generated in a sinusoidal waveform having a single frequency (first order) of 60 Hz (0.016 sec) with respect to an input waveform as shown. In FIG. 16, the driving waveform of the rotating member is generated in a sinusoidal waveform having a double frequency (third order) of 60 Hz and 180 Hz with respect to an input waveform as shown. In FIG. 17, the driving waveform of the rotating member is generated in a sinusoidal waveform having a triple frequency (fifth order) of 60 Hz, 180 Hz and 300 Hz with respect to an input waveform as shown.

Figure 18:
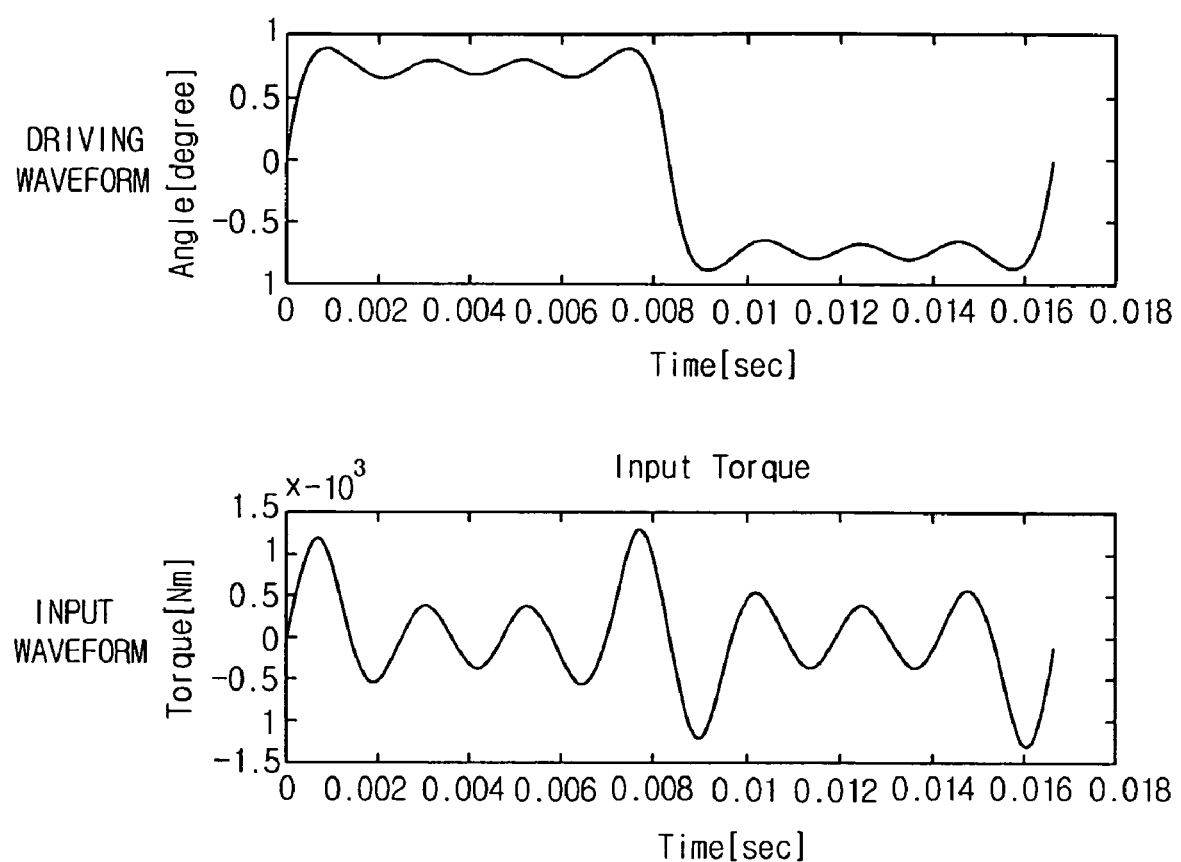

Also, in FIG. 18, the driving waveform of the rotating member is generated in a sinusoidal waveform having a quadruple frequency (seventh order) of 60 Hz, 180 Hz, 300 Hz and 420 Hz with respect to an input waveform as shown.

Figure 19:
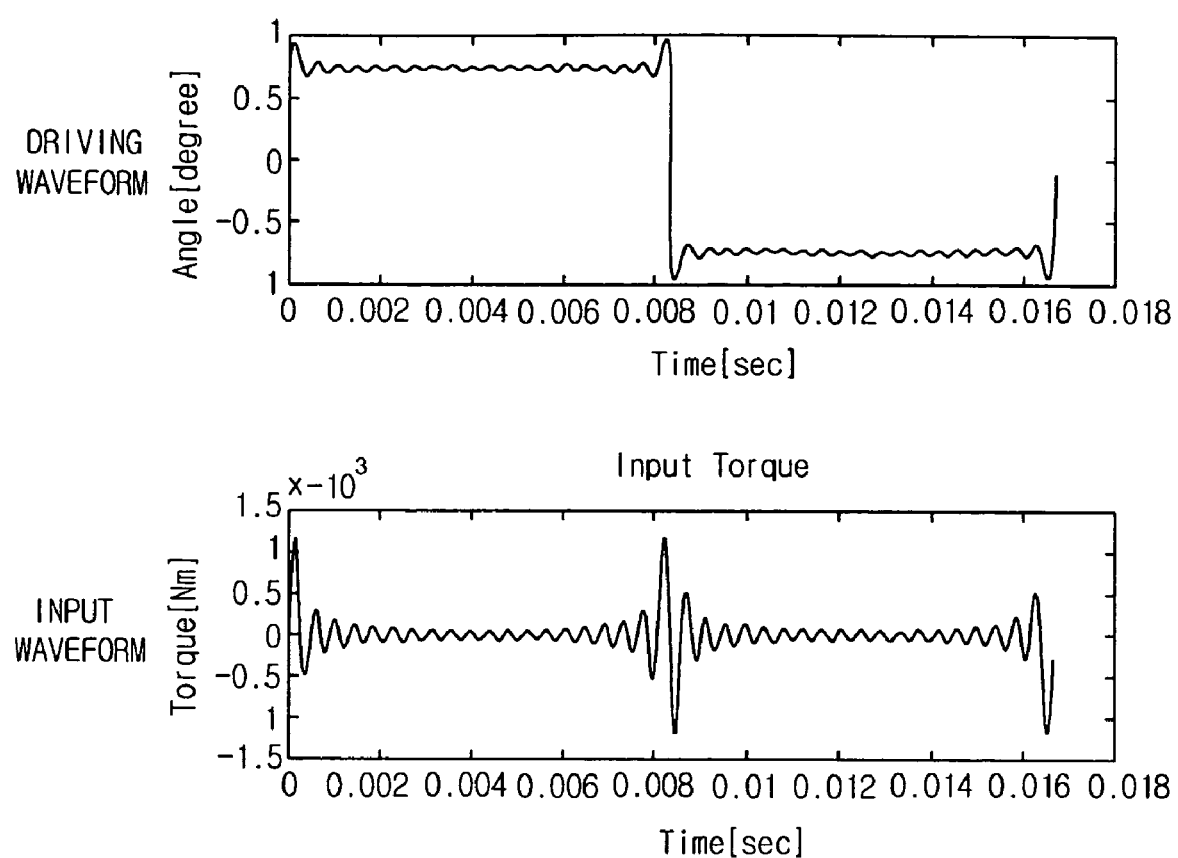
Figure 20:
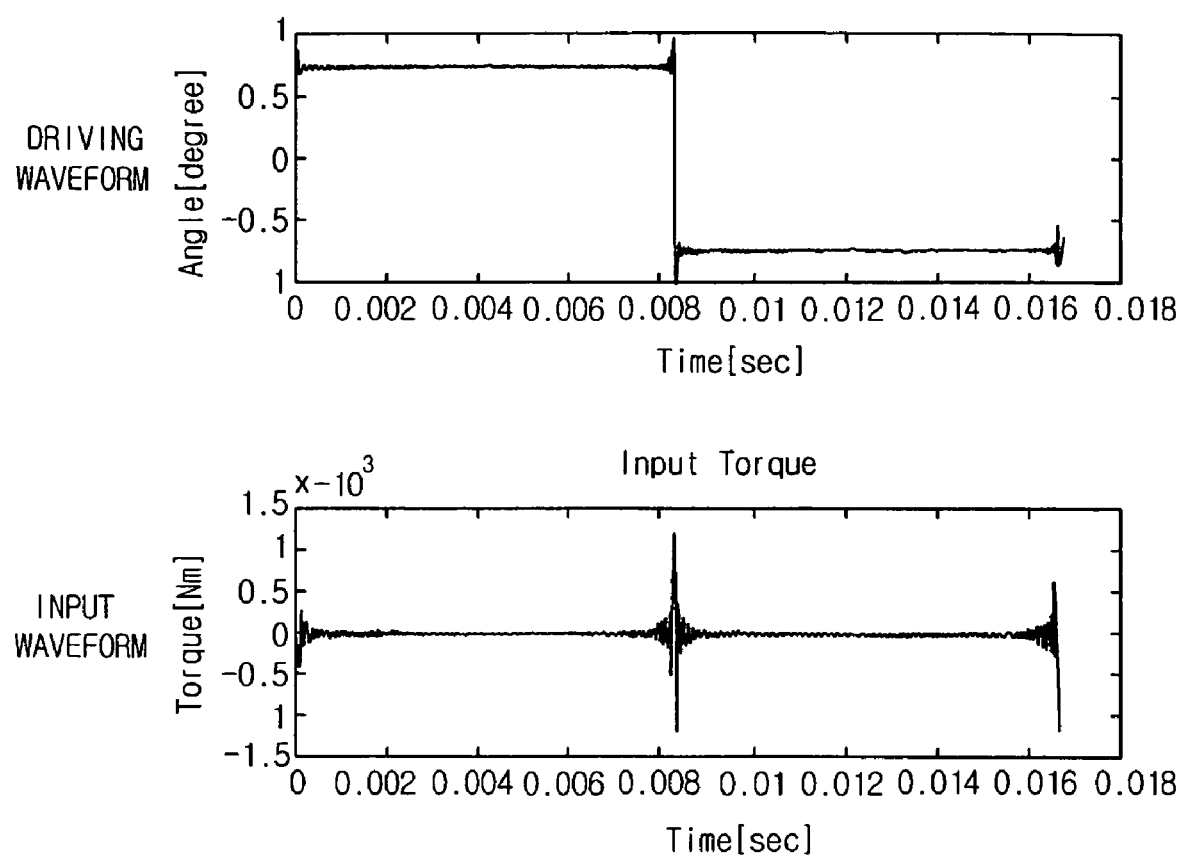

In FIG. 19, the driving waveform of the rotating member is generated in a sinusoidal waveform having a multiple frequency (twentieth order) of 60 Hz to 2340 Hz with respect to an input waveform as shown. In FIG. 20, the driving waveform of the rotating member is generated in a sinusoidal waveform having a multiple frequency of 60 Hz to 11940 Hz with respect to an input waveform as shown.

That is, for example, in the case of the fifth order, the combination of the sinusoidal waves having a triple frequency of 60 Hz, 180 Hz and 300 Hz becomes the driving waveform. In the case of the seventh order, the combination of the sinusoidal waves having a quadruple frequency of 60 Hz, 180 Hz, 300 Hz and 420 Hz becomes the driving waveform. In the case of the ninth order, the combination of the sinusoidal waves having the frequency of 60 Hz, 180 Hz, 300 Hz, 420 Hz and 540 Hz becomes the driving waveform.

Although not shown in the drawings, in the case of a fourth order, the combination of the sinusoidal waves having a double frequency of 120 Hz and 240 Hz becomes the driving waveform. In the case of a sixth order, the combination of the sinusoidal waves having a triple wave of 120 Hz, 240 Hz and 360 Hz becomes the driving waveform. In the case of an eighth order, the combination of the sinusoidal wave having a quadruple frequency of 120 Hz, 240 Hz, 360 Hz and 480 Hz becomes the driving waveform.

In a preferred embodiment of the present invention, the driving waveform of the rotating member has a third-order or higher Fourier series form (third order, fourth order, fifth order, sixth order, seventh order, . . . , n-th order). Specifically, during one period of the driving waveform, the displacement plate disposed at the rotating member rotates by a preset angle ($\theta_1$ in FIG. 4) and then reversely rotates back to the original position.

Accordingly, the resolution improving apparatus that is driven in the third-order or higher Fourier series form causes the image to be alternately displayed at the first location and the second location on the screen, thereby improving the resolution effectively.

According to the driving method of the resolution improving apparatus, the displacement plate is driven in the driving waveform of the approximated square wave, thereby improving the resolution of the display device more effectively.

As described above, an image of one frame is periodically displayed at different locations on the screen. In this manner, the user visually feels as if there are a large number of pixels, such that the resolution can be improved without increasing the number of pixels. Accordingly, the resolution of the large-sized display device can be effectively improved at a low cost.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A display device comprising:
a light source;
an image forming unit for forming an image by using a light emitted from the light source and an inputted image signal;
a projection unit for projecting the image formed by the image forming unit onto a screen;
a movable and light transmitting displacement unit for displacing the image displayed onto the screen; and
a signal application unit for applying an input signal to drive the displacement unit in a Fourier series form.

2. The display device according to claim 1, wherein the displacement unit has a central shaft and rotates about the central shaft within a predetermined angle.

3. The display device according to claim 1, wherein the displacement unit includes:
a displacement plate;
a rotating member to which the displacement plate is fixed; and
a fixing member rotatably coupled to the rotating member.

4. The display device according to claim 1, further comprising a driving unit for driving the displacement unit depending on the input signal,
wherein the input signal includes a square wave.

5. The display device according to claim 1, wherein the driving unit includes a magnet and a coil.

6. A display device comprising:
a light source;
an image forming unit for forming an image by using a light emitted from the light source and an inputted image signal;
a projection unit for projecting the image formed by the image forming unit onto a screen;
a light transmitting displacement unit configured to rotate within a predetermined angle in clockwise and counterclockwise directions to periodically displace the image displayed on the screen; and
a signal application unit for applying an input signal to drive the displacement unit in a Fourier series form.

7. The display device according to claim 6, wherein a driving waveform of the displacement unit has a positive value during a half period and a negative value during a remaining half period.

8. The display device according to claim 6, wherein a driving waveform of the displacement unit is approximated to a square wave.

9. The display device according to claim 6, wherein a waveform of the displacement unit has one of third-order, fourth-order, fifth-order, sixth-order and seventh-order Fourier series forms.

10. The display device according to claim 6, further comprising a driving unit for driving the displacement unit depending on the input signal.

11. A display device comprising:
a signal processing unit for splitting an image signal of one frame into a first sub image signal and a second sub image signal;
an image forming unit for sequentially forming a first image and a second image by using the first sub image signal, the second sub image signal and a light emitted from a light source;
a projection unit for projecting the image formed by the image forming unit onto a screen;
a light transmitting displacement unit configured to rotate within a predetermined angle to displace the image displayed on the screen; and
a signal application unit for applying an input signal to produce a driving waveform of the displacement unit in a third-order or higher Fourier series form, depending on the sub image signals sequentially inputted from the signal processing unit.

12. The display device according to claim 11, wherein the signal application unit applies input signals having reversed phases with respect to the first and second sub image signals.

13. The display device according to claim 11, wherein the input signal has a first peak signal at a second part of a half period and a second peak signal at a first part of the half period.

14. The display device according to claim 11, wherein the driving waveform of the displacement unit has reversed phases with respect to the first and second sub image signals.

15. The display device according to claim 11, further comprising a driving unit for driving the displacement unit depending on the input signal.

16. A display method comprising the steps of:
inputting an image signal having a plurality of frames;
splitting a sequentially inputted image signal of one frame into a plurality of sub image signals;
sequentially inputting the plurality of split sub image signals to form a plurality of images;
applying an input signal to an image displacement unit to display the plurality of images at different locations on a screen;
driving the image displacement unit in a driving waveform of a Fourier series form, depending on the input signal; and
projecting the images passing through the image displacement unit on the screen.

17. The display method according to claim 16, wherein the driving waveform has a positive value during a half period and a negative value during a remaining half period.

18. The display method according to claim 16, wherein the driving waveform is approximated to a square wave.

19. The display method according to claim 16, wherein the driving waveform has one of third-order, fourth-order, fifth-order, sixth-order and seventh-order Fourier series forms.

20. The display method according to claim 16, wherein the input signal has reversed phases with respect to the sequentially inputted sub image signals.

21. The display method according to claim 16, wherein the input signal has a first peak signal at a second part of a half period and a second peak signal at a first part of the half period.

22. The display method according to claim 16, wherein the image displacement unit has a central shaft and rotates about the central shaft within a predetermined angle in the driving step.

* * * * *